(12) United States Patent
Fujino et al.

(10) Patent No.: US 6,783,254 B2
(45) Date of Patent: Aug. 31, 2004

(54) LIGHT GUIDE AND LINE ILLUMINATING DEVICE

(75) Inventors: Kozo Fujino, Osaka (JP); Vladimir Victrovich Serikov, Osaka (JP); Shinji Kawamoto, Osaka (JP); Masafumi Taguchi, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 0 days.

(21) Appl. No.: 09/794,736

(22) Filed: Feb. 27, 2001

(65) Prior Publication Data

US 2001/0019480 A1 Sep. 6, 2001

(30) Foreign Application Priority Data

Mar. 1, 2000 (JP) ........................................ 2000-055101

(51) Int. Cl.[7] .................................................. F21V 7/04
(52) U.S. Cl. .......................... 362/31; 362/551; 362/555; 362/556; 362/146
(58) Field of Search .......................... 362/31, 551, 555, 362/556, 146; 385/146

(56) References Cited

U.S. PATENT DOCUMENTS

| | | | | |
|---|---|---|---|---|
| 4,257,084 A | * | 3/1981 | Reynolds | 362/31 |
| 4,791,540 A | * | 12/1988 | Dreyer, Jr. et al. | 362/331 |
| 5,600,455 A | * | 2/1997 | Ishikawa et al. | 349/57 |
| 5,655,827 A | * | 8/1997 | Kaneko et al. | 362/31 |
| 6,305,811 B1 | * | 10/2001 | Beeson et al. | 362/31 |

FOREIGN PATENT DOCUMENTS

| | | |
|---|---|---|
| JP | 08-1633320 | 6/1996 |
| JP | 10-126581 | 5/1998 |

* cited by examiner

Primary Examiner—Stephen Husar
Assistant Examiner—Sharon Payne
(74) Attorney, Agent, or Firm—Merchant & Gould P.C.

(57) ABSTRACT

A light guide 1 is provided at the reverse side thereof with triangular uneven surfaces 1b at a predetermined pitch. The uneven surfaces 1b are integrally formed with the light guide 1 when the latter 1 is injection-molded. Incident light from a light incident plane is caused to be scattered at uneven surfaces 1b within the light guide and to spread in a main scanning direction. The light scattered is emitted from an emission plane. Intensity of light in the main scattering direction can be made uniform by lengthening the uneven surfaces 1b as the uneven surfaces extend from the light incident plane. A position where the light intensity becomes maximum in a sub-scanning direction can be changed by adjusting an angle between the ridgeline of the uneven surfaces 1b and the sub-scanning direction, and distributed characteristics of the light intensity in the sub-scanning direction can be also changed.

5 Claims, 13 Drawing Sheets

Main scanning direction  (Longitudinal direction)

LIGHT GUIDE AND LINE ILLUMINATING DEVICE

BACKGROUND OF THE INVENTION

1. Field of the Invention

The present invention relates to a light guide used in a facsimile machine, a copying machine, a hand scanner and the like and, more particularly, to a line illuminating device which is incorporated with the light guide therein.

2. Description of the Prior Art

Equipment such as a facsimile machine, a copying machine and a hand scanner is provided with an image reading device such as an image sensor for reading a manuscript. Used as a type of image reading device is a close-contact type image sensor of which the optical path length is short and which can be easily incorporated in the equipment. In this close-contact type image sensor, it is necessary to read the portion of the manuscript to be read by illuminating in excess of the intensity of illumination readable by an illuminating device. In this case, the range to be illuminated is quite long in the main scanning direction (in the longitudinal direction), but is a narrow, belt-like strip in a sub-scanning direction at right angles to the main scanning direction.

An illuminating device using a bar-shaped or plate-shaped light guide for illuminating the above-mentioned long and narrow belt-like range and a manuscript reading device provided with such an illuminating device are disclosed in Japanese Unexamined Patent Publication No. Hei 8-163320 and Hei 10-126581.

Figure 13:
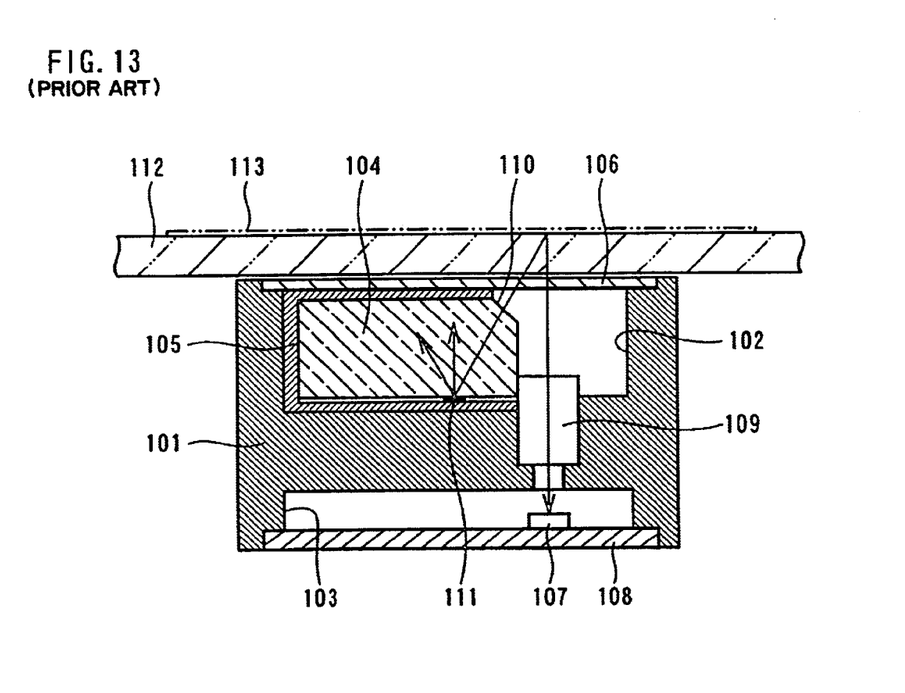
FIG. 13 is a cross-sectional view of a manuscript-reading device into which the conventional line illuminating device is incorporated.

This manuscript reading device is, as shown in FIG. 13, provided with a frame 101 which is formed with recesses 102 and 103. The recess 102 is provided therein with a casing 105 which houses a bar-shaped light guide 104 and an opening portion of the recess 102 is closed by a glass plate 106. A basal plate 108 provided with a photoelectric conversion element (sensor) 107 is attached to the frame in the recess 103. The frame 101 also holds a rod lens array 109 therein.

The bar-shaped light guide 104 is made of glass or transparent resin. The cross-sectional shape of the bar-shaped light guide 104 in the direction at right angles to its longitudinal direction is basically rectangular. The bar-shaped light guide 104 has a chamfered C-shaped portion and serves as an emission plane 110. The bar-shaped light guide 104 is also provided with a luminous means (not shown) such as an LED at one end of the longitudinal direction thereof (i.e. the direction at right angles to the paper surface). The light from this luminous means is introduced to the inside of the bar-shaped light guide 104 from one end of the bar-shaped light guide 104. The illuminating light spreading through the bar-shaped light guide 104 is then scattered in a light scattering pattern 111 formed on one side of the bar-shaped light guide. This scattered light is incident on a reading image surface of a manuscript 113 from the emission plane 110 through a cover glass 112 of a manuscript stand. The reflected light is then detected by the photoelectric conversion element 107 through the rod lens array 109 to read the manuscript.

The light scattering pattern 111 is formed by transferring a white coating material to the surface of the light guide by silk screen printing. However, in the case of the silkscreen printing, there is a problem that the size of a transfer dot varies with many factors such as the clogging condition of a screen, temperature, humidity, diluting condition of a solvent, and splash of the coating material due to static electricity. It is therefore not possible to reproduce the optimum light scattering pattern on the surface of many light guides and as a result, the yield rate of production is decreased. Also, in the case of silkscreen printing, there is another problem that modification and production must be repeated until satisfactory uniformity is obtained and thus, time and cost are increased.

SUMMARY OF THE INVENTION

To solve such problems as above, a light guide according to the present invention is provided with an uneven surface for scattering at least light on the predetermined surface thereof (a side will also do) except for the light incidence plane and the light emission plane. It is preferable to integrally form an uneven surface when the light guide is injection-molded. The uneven surface may be formed so that the ridgeline thereof is at right angles to the longitudinal direction of the light guide. However, it is preferable to form an uneven surface of which the ridgeline goes in a different direction rather than at right angles to the longitudinal direction of the light guide.

In the light guide according to the present invention, the uneven surface is integrally formed when the light guide is injection-molded. Accordingly, a process for forming a light scattering pattern by silkscreen printing is no longer needed. Thus, it is possible to economically provide the light guide with uniform characteristics. If the ridgeline direction of the uneven surface differs from the direction at right angles to the longitudinal direction of the light guide, it is possible to take out the light reflected at an inclined plane of the uneven surface directly from the light emission plane. Thus, it is possible to increase the intensity of the emitted light.

In the prior art, the scattered light has been prevented from being emitted uselessly by covering the outside of the light guide with a casing. In the present invention, however, it is also possible to secure the necessary intensity of illumination even without the casing if the forming direction of the uneven surface is set to differ from the direction (i.e. a sub-scanning direction) at right angles to the longitudinal direction. Further, by changing an angle of inclination or position of the uneven surface (i.e. an angle between the ridgeline of the uneven surface and the subscanning scanning direction), it is possible to adjust the position at which the intensity of light reaches its peak on a manuscript surface.

According to a line illuminating device of the present invention, the light guide is housed in a casing so that the light emission plane of the light guide is exposed. The light guide is provided at one end thereof with a luminous means and the uneven surface is formed extending from the end provided with the luminous means toward the other end. Since the light guide is covered by the casing, the line illuminating device can be easily handled (for example, it is not necessary to make arrangements for preventing stains and the like on the light guide when assembled). Further, because the casing serves to prevent the scattered light from being emitted uselessly outside the light guide, it is possible to increase the intensity of the emitted light. By changing the length of the light reflecting and scattering uneven surface from the end which is provided with the luminous means toward the other end, it is possible to obtain a uniform light intensity over the full length of the line illuminating device. If the length of the uneven surface is kept fixed and the range of the uneven surface forming area or the angle of inclination of the uneven surface is changed, it is also possible to obtain a uniform light intensity along the full length of the line illuminating device.

The line illuminating device according to the present invention may be constructed without the casing. When the casing is not provided, the cost of the line illuminating device can be lowered.

BRIEF DESCRIPTION OF THE DRAWINGS

The above and other objects, features and advantages of the present invention will become more apparent from the following description when taken in conjunction with the accompanying drawings.

FIG. 3 is a perspective view showing a second embodiment of the light guide according to the present invention, in which FIG. 3 (a) is a perspective view showing the forming area of the light-reflecting and-scattering uneven surface, and FIG. 3 (b) is an enlarged perspective view showing the structure of the light-reflecting and -scattering uneven surface pattern;

DETAILED DESCRIPTION OF THE PREFERRED EMBODIMENTS

Figure 1:
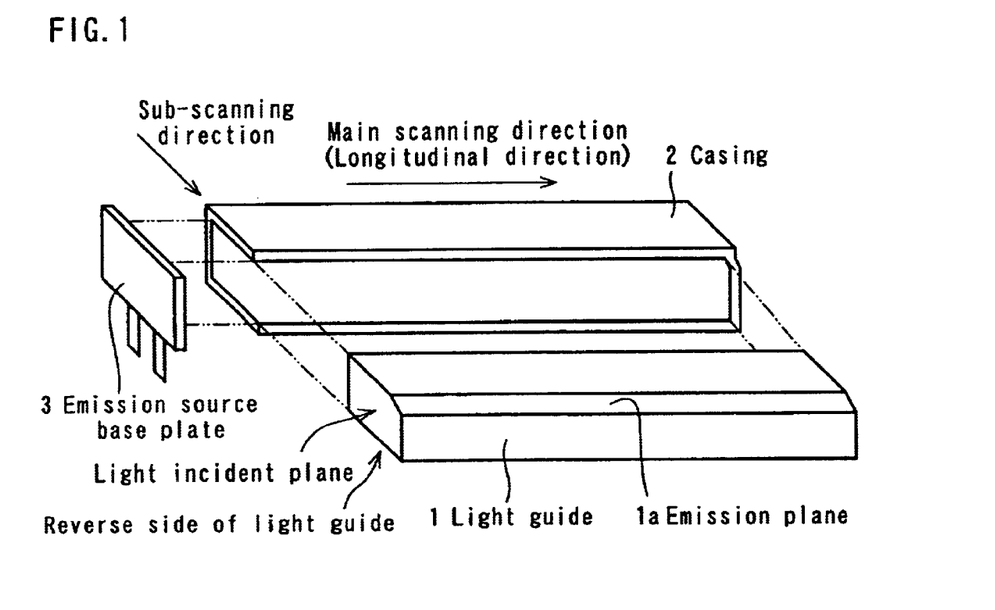
FIG. 1 is an exploded perspective view of a line illuminating device according to the present invention.
Figure 2:
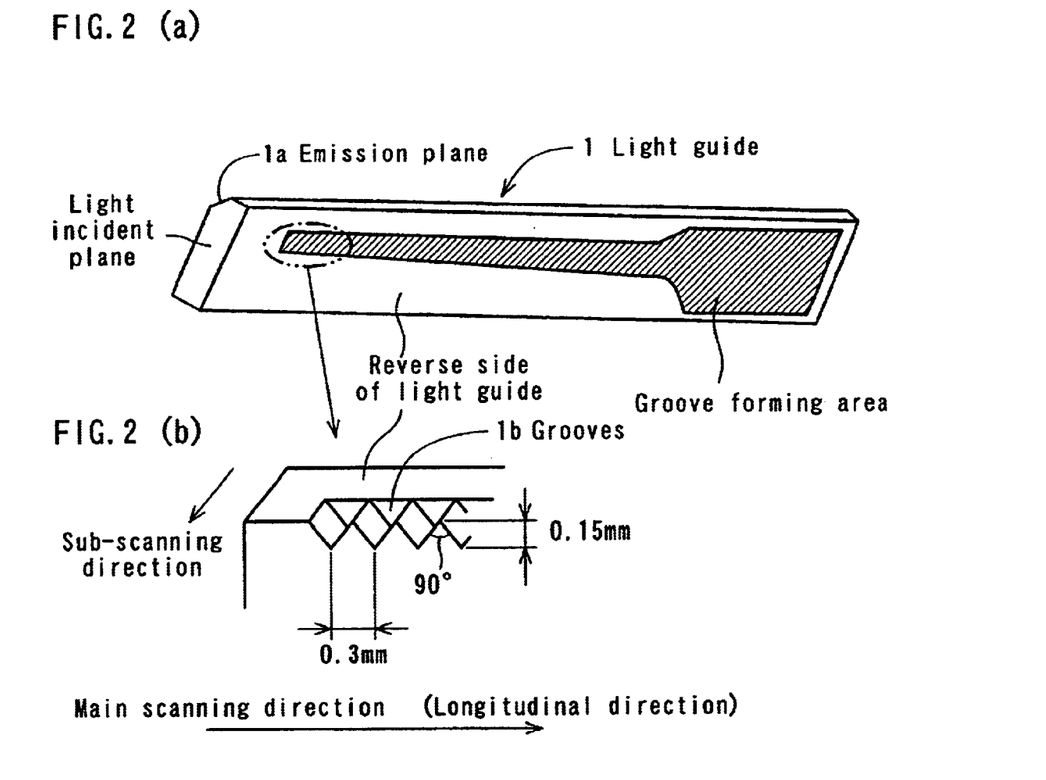
FIG. 2 is a perspective view showing a first embodiment of a light guide according to the present invention, in which FIG. 2 (a) is a perspective view showing a forming area for a light-reflecting and-scattering uneven surface, and FIG. 2 (b) is an enlarged perspective view showing a structure of a light-reflecting and -scattering uneven surface pattern.

Preferred embodiments of the present invention will now be described with reference to the accompanying drawings. FIG. 1 is an exploded perspective view of a line illuminating device according to the present invention. FIG. 2 is a perspective view showing a first embodiment of a light guide according to the present invention and FIG. 3 is a perspective view showing a second embodiment of the light guide according to the present invention.

As show in FIG. 1, a line illuminating device is provided in which a light guide 1 is housed in a white casing 2 in such a manner that an emission plane 1a is exposed. Attached to one end of the white casing 2 is an emission source base plate 3 which is provided with a luminous means consisting of LED and the like.

The light guide 1 is made of resin with high light transmission properties such as acryl and polycarbonate or an optical glass with high light transmission properties. The basic shape of the cross-section of the light guide 1 is rectangular and a corner section is chamfered in a C-shape to serve as a light emission plane 1a. As shown in FIGS. 2 and 3, the light guide 1 is provided, on its reverse side, with an uneven surface 1b for at least scattering the light.

Figure 3A:
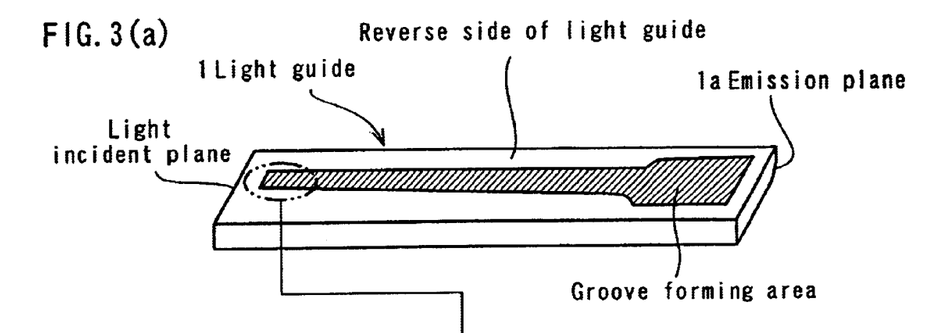
Figure 3B:
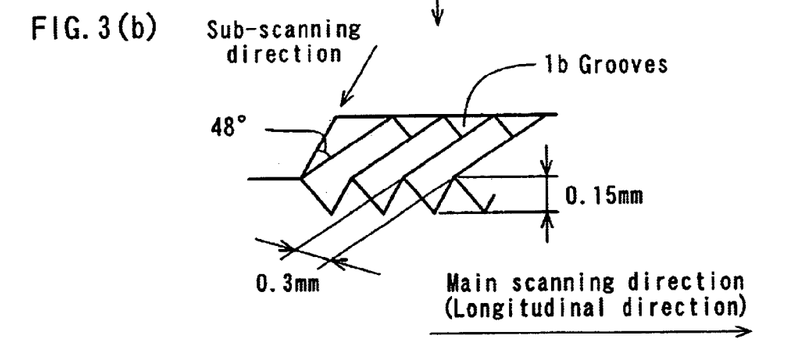

In FIGS. 2 and 3, reference letter (a) shows an area forming the uneven surface 1b by hatching and reference letter (b) shows an enlarged structure of an uneven surface pattern.

A first embodiment of a light guide according to the present invention is shown in FIG. 2. The light guide 1 is provided, on its reverse side, with a plurality of uneven surfaces 1b of which the ridgelines are arranged parallel to a sub-scanning direction (i.e. the direction at right angles to the main scanning direction). One example of the uneven surface shape is as follows. The height, pitch and apex angle of the uneven surface 1b are 0.15 mm, 0.3 mm and 90° respectively. As shown in FIG. 2 (a), the length of the uneven surfaces 1b is shortened on a side near a light incident plane, while the length of the uneven surfaces 1b is lengthened as the uneven surfaces 1b recede from the light incident plane. Intensity of light incident from an emission source is large on a side near the light incident plane, while the light intensity becomes smaller as the uneven surfaces 1b recede from the light incident plane. Accordingly, as shown in FIG. 2 (a), if the length of the uneven surfaces 1b is increased (i.e. an uneven surface forming area is expanded) as the uneven surfaces recede farther from the light incident plane, it is possible to make uniform the intensity of light emitted from the light emission plane 1a over the full length of the main scanning direction. The uneven surfaces may be formed intermittently on the side near the light incident plane. In particular, in the event that when the length of the uneven surfaces is shortened, it is difficult to form the uneven surfaces, it is also possible to make uniform the intensity of light emitted from the light emission plane 1a over the full length of the main scanning direction by changing the space for forming the uneven surfaces upon securing the length of the uneven surfaces to a certain extent or by changing the number of continuous uneven surfaces.

A second embodiment of the light guide according to the present invention is shown in FIG. 3. The light guide 1 is provided, on the reverse side thereof, with uneven surfaces 1b of which the ridgeline is formed to incline by a predetermined angle relative to the sub-scanning direction (i.e. the direction at right angles to the main scanning direction). One example of the uneven surface shape is as follows. The height, pitch and apex angle of the uneven surfaces 1b are 0.15 mm, 0.3 mm, and 90° respectively, and the angle between the ridgeline of the uneven surfaces and the sub scanning direction is 48°. As shown in FIG. 3 (a), the length of the uneven surfaces 1b is reduced on the side near the light incident plane, while the length of the uneven surfaces 1b is increased as the uneven surfaces 1b recede further from the light incident plane. The intensity of light incoming from the emission source is large on the side near the light incident plane, while the intensity of light becomes small as the uneven surfaces recede further from the incident plane. Accordingly, as shown in FIG. 3 (a), if the length of the uneven surfaces 1b is increased (i.e. the uneven surface forming area is expanded) as the uneven surfaces extend farther from the light incident plane, it is possible to make uniform the intensity of light emitted from the emission plane 1a over the full length of the main scanning direction. The uneven surfaces may be formed intermittently on the side near the light incident plane. In particular, in the case where when the length of the uneven surfaces is shortened, it is difficult to form the uneven surfaces, it is also possible to make uniform the intensity of light emitted from the emission plane 1a over the full length of the main scanning direction by changing the space for forming the uneven surfaces upon securing the length of the uneven surfaces to a certain extent, or by changing the number of the continuous uneven surfaces. It may also be an effective method to change the angle of inclination of the uneven surfaces.

Figure 4:
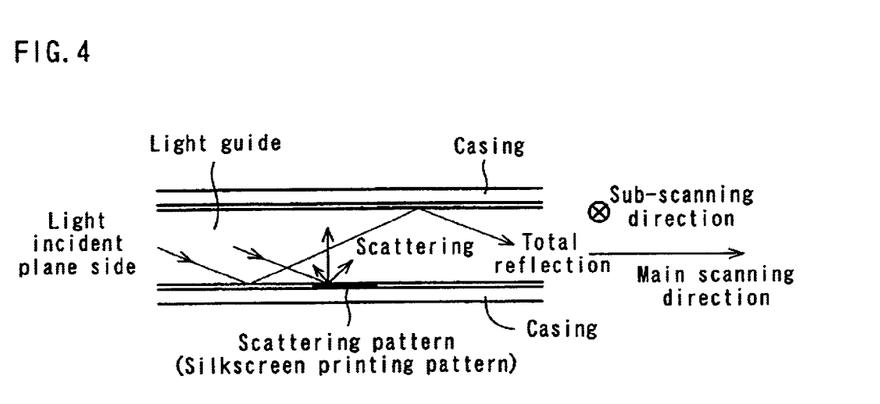
FIG. 4 is an explanatory view showing the light irradiation principle of the line illuminating device using a conventional light guide in which white coating material is transferred by silkscreen printing to form a scattered pattern.

Next, the light irradiation principle of the line illuminating device will be described. First, the line irradiation device using a light guide provided with a conventional scattering pattern is described. As shown in FIG. 4, the conventional light guide forms the scattering pattern by transferring white coating material to the reverse side of the light guide by a silkscreen printing method. Light received from the incident plane is caused to generate total reflection within the light guide before it spreads in the main scattering direction (i.e. the longitudinal direction). Once the light reaches the scattering pattern (a light scatterer) which has been print-formed on the reverse side of the light guide, the light is diffuse-reflected. A part of the diffuse reflected light is emitted from the nearby chamfered portion (i.e. the emission plane). As shown in FIG. 4, a part of the scattered light which has impinged on the white coating material or the nearby casing surface and diffuse-reflected is removed from the emission plane.

Figure 5:
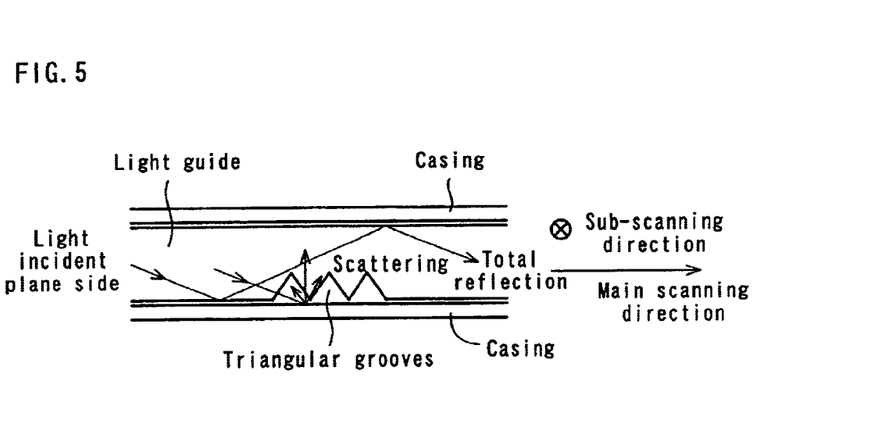
FIG. 5 is an explanatory view showing the light irradiation principle of the line illuminating device using the light guide of the first embodiment.

FIG. 5 is an explanatory view showing the light irradiation operation of the line illuminating device using the light guide of the first embodiment. The light received from the incident plane is caused to generate total reflection within the light guide and spreads in the main scanning direction (i.e. longitudinal direction). When the scatterer consisting of a triangular uneven surface is provided on the reverse side of the light guide, the light reaching this point is refracted and transmitted as shown in FIG. 5 and then impinges on the casing, and as a result, the same scattered light as described above is obtained. Namely, it is possible to obtain the same effect as when the uneven surface is formed on the reverse side of the light guide to print the white coating material, thereby forming the scattering pattern.

Since the uneven surfaces can be integrally formed when the light guide is injection-molded, it is possible to eliminate the printing process for forming the conventional scattering pattern.

Figure 6:
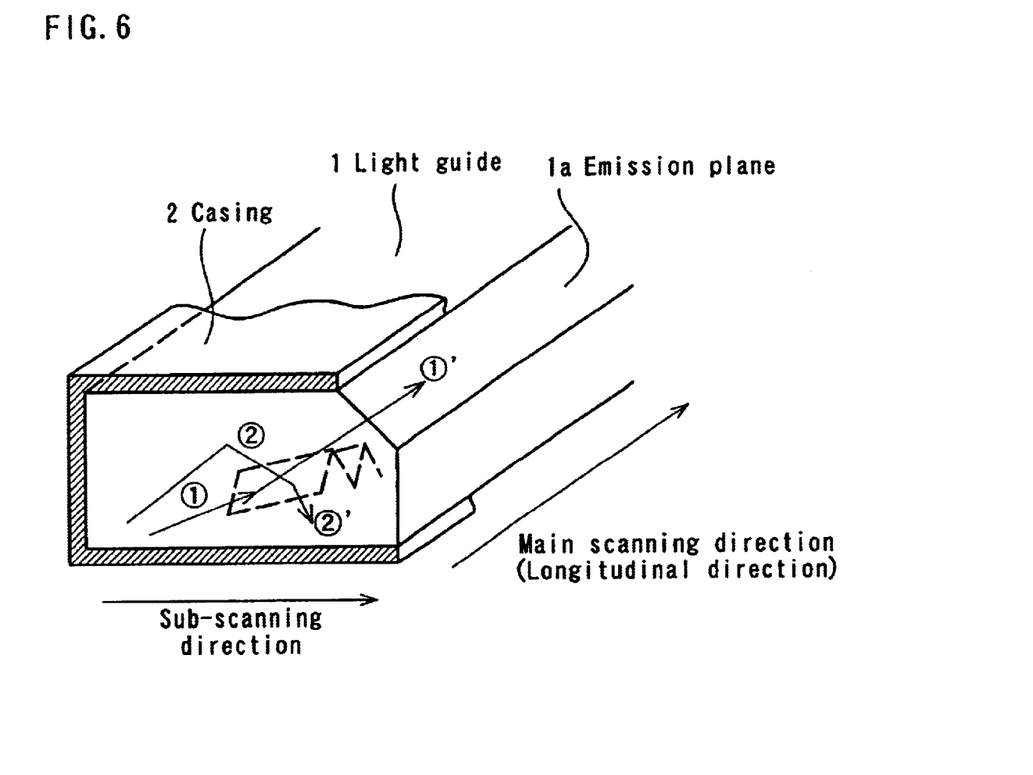
FIG. 6 is an explanatory view showing the light irradiation principle of the line illuminating device using the light guide of the second embodiment.

FIG. 6 is an explanatory view showing the light irradiation operation of the line illuminating device using the light guide of the second embodiment. In the line illuminating device using the light guide of the second embodiment, since the inclined plane of the triangular uneven surface has an effect of a mirror finished surface in addition to the above-mentioned light scattering effect, the reflected light component is effectively used to improve the emission efficiency. Namely, the light guide of the second embodiment and the line illuminating device using such a light guide are characterized in that the light guide is provided, on its reverse side, with the inclined plane of the triangular uneven surfaces so that the incident light can also have the total reflection effect in addition to a mere light spreading effect by the scatterer such as white coating material or the casing. An effect of the light reflection will be described with reference to FIG. 6. In the light guide of the second embodiment, the ridgeline of the triangular uneven surfaces is designed to have a shape which is not parallel to the sub-scattering direction, in which the light as shown by a reference numeral ① in the figure can generate total reflection at the inclined plane of the uneven surfaces and proceed to the chamfered emission plane, while the light ② penetrates the inclined plane of the uneven surfaces, impinges on the casing and becomes scattered light.

The light guide of the first embodiment is arranged so that the ridgeline of the triangular uneven surfaces is parallel to the sub-scattering direction and the light guide handles only the scattered light. On the other hand, in the light guide of the second embodiment, if the component of the total reflection light can be used as illuminating, the component does not go through the scattering process. Accordingly, the component of the light ① shows no loss in quantity of light and thus, the component can be effectively used 100% for illuminating purposes. In addition, in the light guide of the second embodiment, since the total reflection light takes a course to directly irradiate the chamfered emission plane, it is possible to separate the peak position from the end of the light guide.

Figure 7:
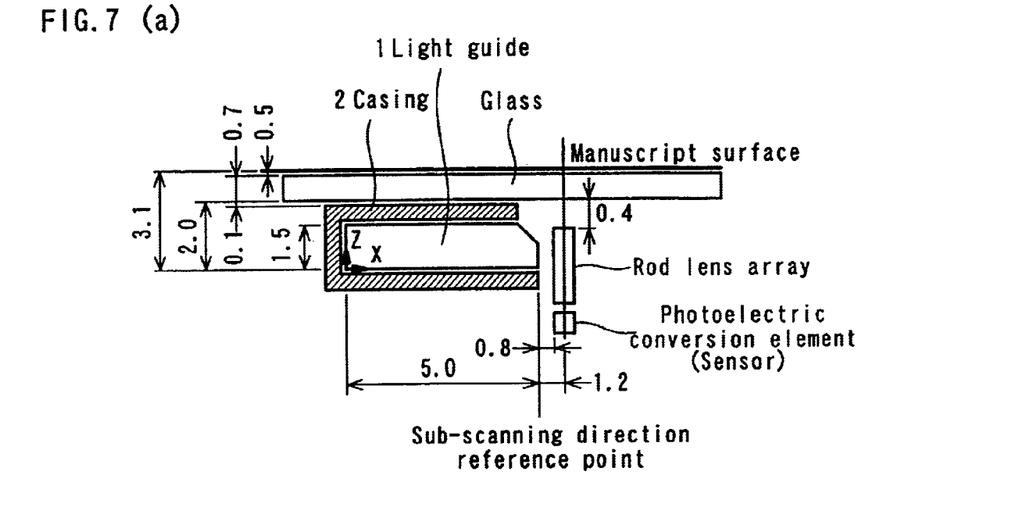
FIG. 7 is a structural view showing one example of an image reading device which is constructed using the line illuminating device according to the present invention, in which FIG. 7 (a) is an explanatory view showing the cross-sectional structure with actual dimensions, and FIG. 7 (b) is an explanatory view showing the shape of a light emission plane of the light guide.

FIG. 7 is a structural view showing one example of an image reading device constructed using the line illuminating device according to the present invention. Here is described an A-8 size image reading device of which the effective length of the line illuminating is about 55 mm. The light guide 1 is made of transparent general-purpose acryl and chamfered in a C-shape as shown in FIG. 1, in which the height, width (i.e. the length in the sub-scanning direction), and length (i.e. the length in the main scanning direction) are set at 1.5 mm, 5 mm and 64 mm, respectively. The measurement of the chamfered portion is, as shown in FIG. 7 (b), 0.5 mm in each direction and the angle of the emission plane 1a is 45°. Used as an LED is a product of Nichia Corporation of which the green dominant wavelength is 520 nm and the output at the forward current of 20 mA is 1.5 mW. A casing 2 made of non-transparent white polycarbonate is used. A product of Nippon Sheet Glass Co., Ltd., of which the model No. is SLA-20E is used as a rod lens array. The cross-sectional structure of this A-8 size image reading device is shown in FIG. 7 (a) together with actual dimensions.

Figure 8:
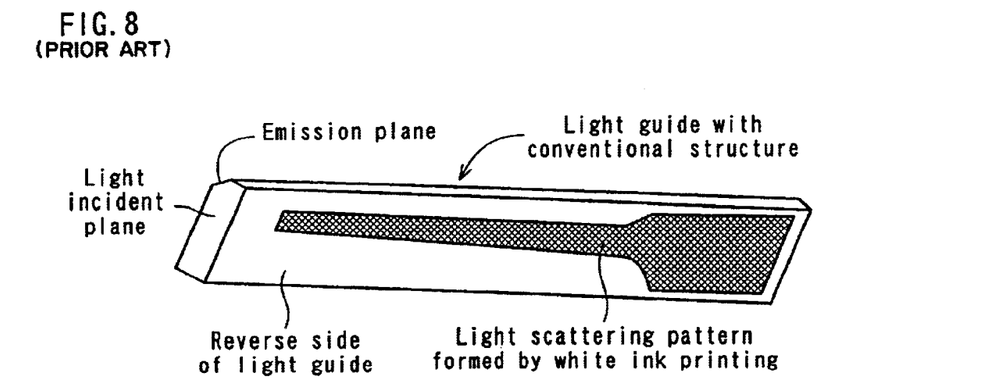
FIG. 8 is an explanatory view showing diagrammatic shape of a light scattering pattern of the light guide with a conventional structure.

Distributed characteristics of brightness of the line illuminating have been measured for each of the light guides with conventional structure, the light guide according to the first embodiment, and the light guide according to the second embodiment, using the A-8 size image reading device is shown in FIG. 7. The light guide with the conventional structure uses highreflection white ink of Teikoku Printing Inks Mfg. Co., Ltd. as a white coating material scatterer and the light scattering pattern is formed by a silkscreen printing method. Diagrammatic shape of the light scattering pattern of the light guide with the conventional structure is shown in FIG. 8.

Figure 9:
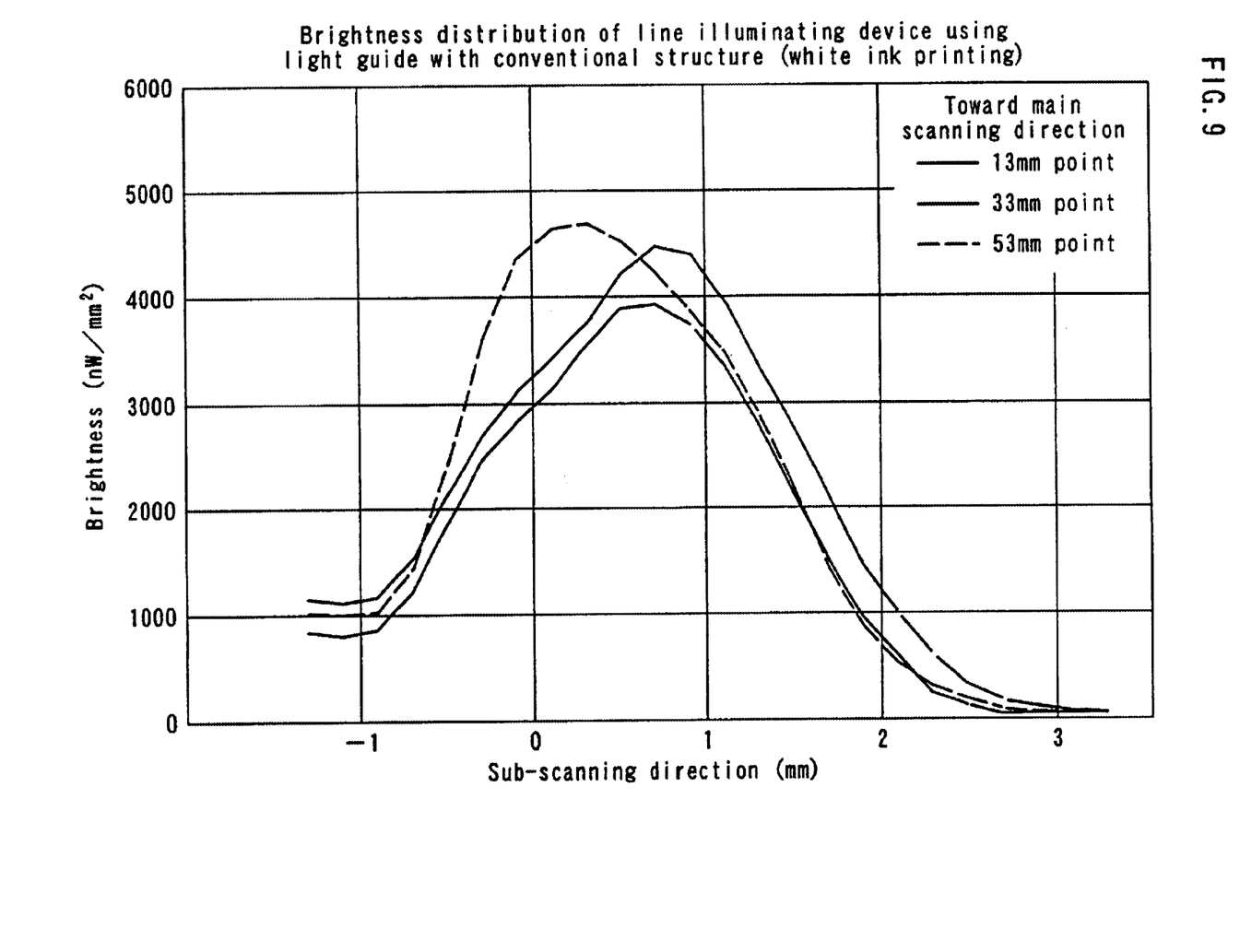
FIG. 9 is a graph showing measured results of distributed characteristics of brightness of an A-8 size image reading device using a conventional line illuminating device which is provided with a conventional light guide.
Figure 10:
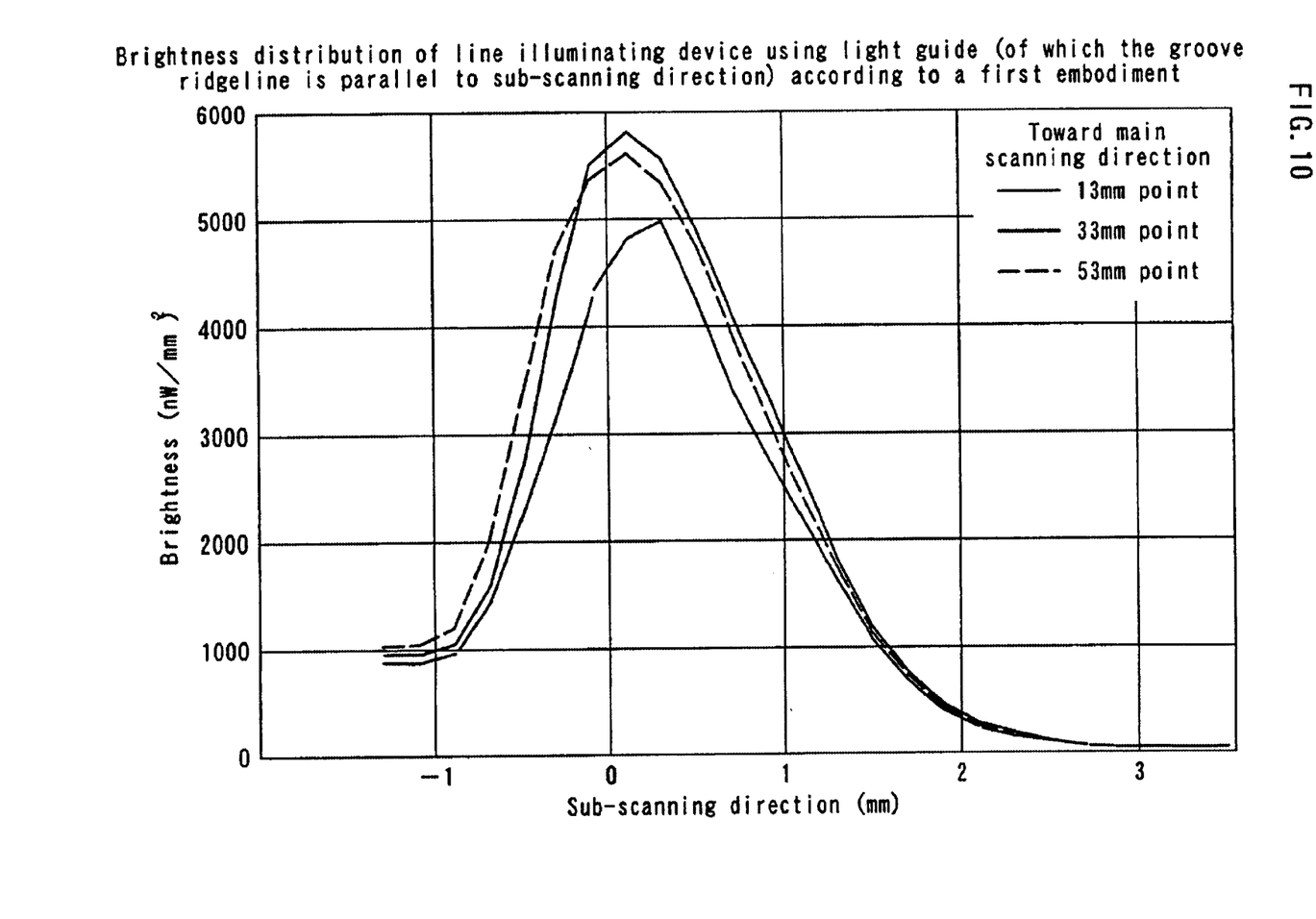
FIG. 10 is a graph showing the measured results of distributed characteristics of brightness of the A-8 size image reading device using the line illuminating device according to the present invention which is provided with the light guide of the first embodiment.
Figure 11:
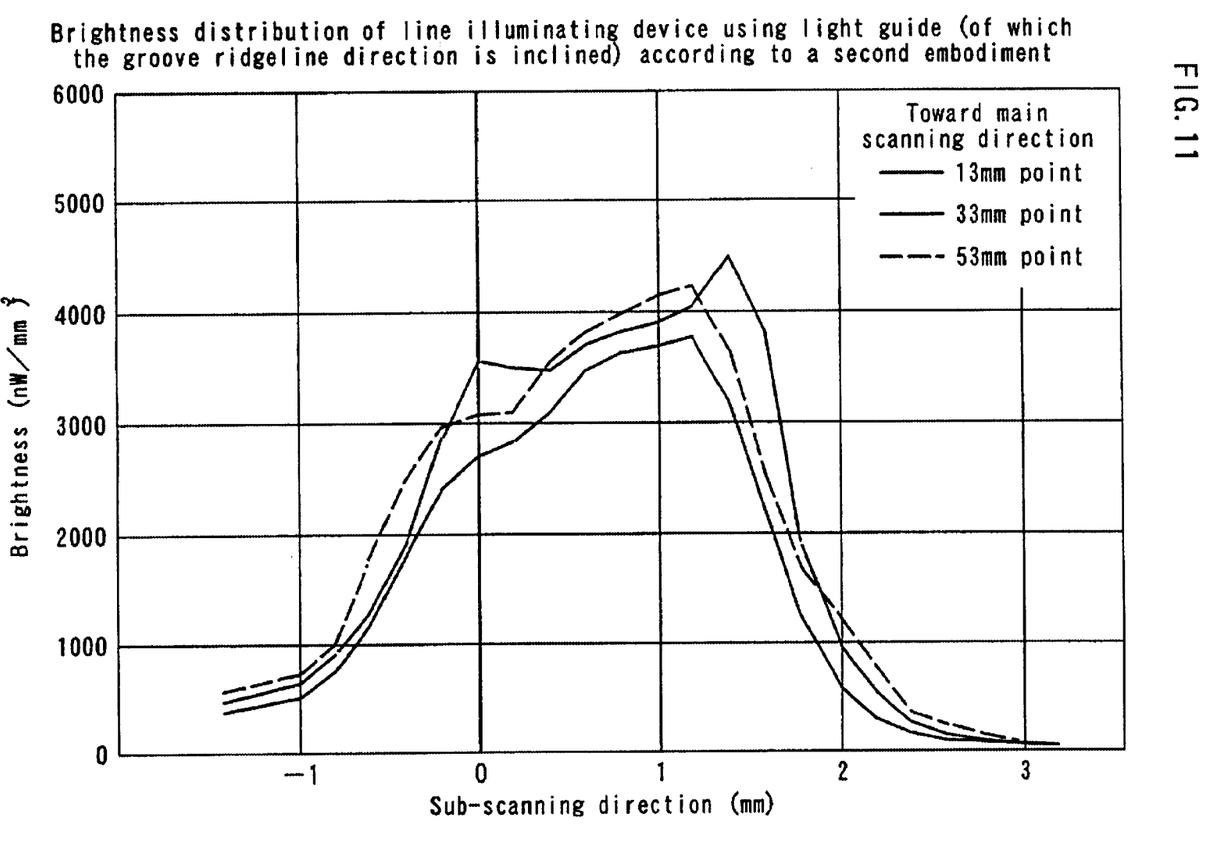
FIG. 11 is a graph showing the measured results of distributed characteristics of brightness of the A-8 size image reading device using the line illuminating device according to the present invention which is provided with the light guide of the second embodiment.

Measured results of the distributed characteristics of brightness of the A-8 size image reading device using the light guide with the conventional structure are shown in FIG. 9. Measured results of the distributed characteristics of brightness of the A-8 size image reading device using the light guide according to the first embodiment are shown in FIG. 10. Measured results of distributed characteristics of brightness of the A-8 size image reading device using the light guide according to the second embodiment are shown in FIG. 11. In FIGS. 9 through 11, the horizontal axis is the sub-scattering direction and the vertical axis is the brightness. The scale 0 of the horizontal axis is a sub-scanning direction reference point (i.e. an end of a side of the emission plane of the light guide) as shown in FIG. 7 (a). Distribution of brightness relative to the sub-scanning direction has been measured at 3 points which are 13 mm, 33 mm, and 53 mm away from the incident plane of the light guide in the main scanning direction, and the measured results are shown.

The peak positions of the light intensity for both the light guide with the conventional structure and the light guide according to the first embodiment are close to the sub-scanning direction reference point (i.e. the end of the emission plane side of the light guide). Both light guides show more or less the same light intensity at a position about 0.6 mm away from the sub-scanning direction reference point (i.e. the end of the side of the emission plane of the light guide). Accordingly, if a photoelectric conversion element is installed at this position, brightnesses of manuscript positions to be read are both equal, and there is no difference in the basic performance of the line illuminating device between them.

In the case of the light guide according to the second embodiment, the peak position of the light intensity is situated about 1.2 mm away from the sub-scanning direction reference point (i.e. the end of the side of the emission plane of the light guide). The brightness of the manuscript to be read at this position (about 1.2 mm) was twice the brightness of the light guide according to the first embodiment. Thus, when the image reading device of the close-contact type image sensor method is designed, it is possible to irradiate the portion brightly according to the position of the photoelectric conversion element (sensor), and thus the degrees of freedom have increased. Namely, the position of the photoelectric conversion element (sensor) in the image reading device of the close-contact type image sensor method is designed in various ways (1 mm or so) from a parts arrangement point of view, but it is possible to adjust the performance of the line illuminating device so that the manuscript surface right above the position of the photoelectric conversion element (sensor) can be brightened for each type of device. In the present invention, the adjustment of brightness is made by inclining the ridgeline of the uneven surfaces from the sub-scattering direction. Further, as shown in FIG. 11, distribution of section (i.e. distribution of brightness relative to the sub-scanning direction) has a broad waveform and as a result, the brightness is not affected (i.e. becomes insensitive) by deviation of positional accuracy of the image reading device of the close-contact type image sensor method in assembling. Accordingly, the line illuminating device using the light guide according to the second embodiment can also provide uniformity of brightness which is stable with regard to the deviation of the positional accuracy.

In the line illuminating device using the light guide according to the second embodiment, it is possible to obtain favorable characteristics even though the casing covering the light guide is eliminated. Since the uneven surfaces makes rather better use of a reflection effect than the conventional light scattering effect, the casing covering the outer peripheral portion of the light guide does not significantly contribute to the increase of quantity of light. In the printing type's light guide and the like, an optical role of the casing is to prevent the scattered light from being scattered (lost) outside and to return the light to the inside of the light guide by reflection of the casing surface, to increase the quantity of light at the emission plane, thereby brightening the manuscript surface. On the contrary, the light guide according to the second embodiment has less light scattering component and therefore, much "lock-in effect of the light" by the casing cannot be expected.

Figure 12:
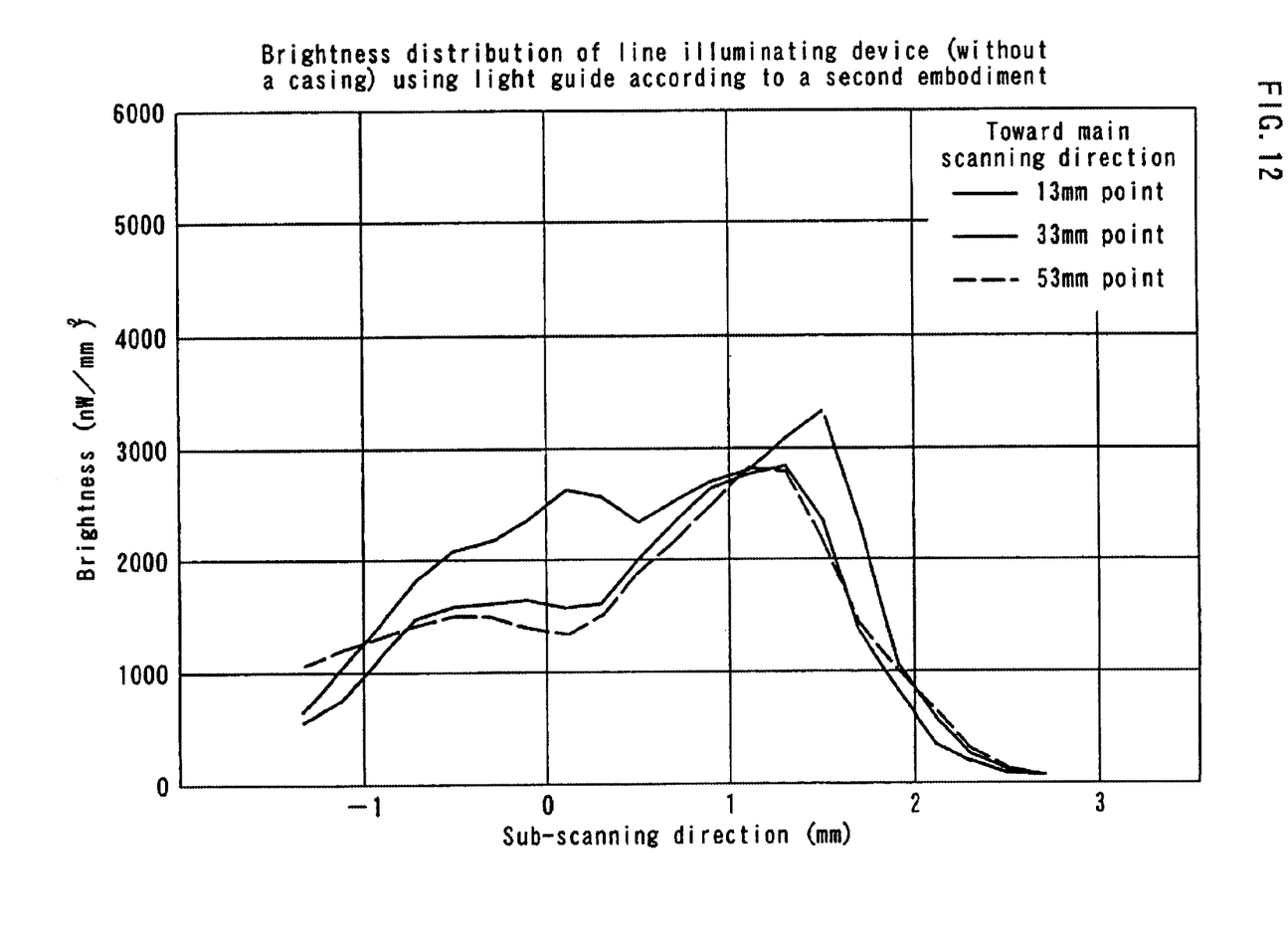
FIG. 12 is a graph showing the measured results of distributed characteristics of brightness of the line illuminating device as a structure without a casing using the light guide according to the second embodiment.

FIG. 12 shows measured results of the distribution of brightness of the line illuminating device which is not provided with the casing, using the light guide according to the second embodiment. The brightness at a position which is about 1.2 mm away from the sub-scanning direction reference point (i.e. the end of the side of the emission plane of the light guide) consists of about 76% of the quantity of light relative to the line illuminating device with the casing (see graphs of FIG. 11). The brightness at the same position as above also consists of about 90% of the quantity of light relative to the conventional printing type's line illuminating device (see graphs of FIG. 9). Brightness performance is therefore almost of the same level. Thus, a low-priced, simple type of line illuminating device which has no printing process and cover (i.e. the number of parts and process are eliminated) can be realized.

In each embodiment, the apex angle of the triangular uneven surface is shown as 90°, but it may differ from 90°. It is to be noted that the dimensions of the uneven surfaces, pitch of the uneven surfaces, and the like are merely shown as one example and these may be selectively changed according to the specifications required for the light guide. Further, the outer shape of the light guide is shown as a chamfered rectangular solid, but it may be a polygon or a curved surface.

It is also to be noted that the outer shape of the light guide may be a chamfered rectangular solid, an other shape or a curved surface body.

As described above, according to the present invention, the uneven surfaces for scattering or reflecting the light to the predetermined surface of the light guide is integrally formed with the light guide. It is therefore not necessary to form the light scattering pattern and the like according to the printing process and it is possible to provide a low-priced light guide and a line illuminating device. Since the light guide provided with light reflecting and scattering uneven surface is integrally formed by injection molding, it is possible to form the uneven surfaces for high precision light reflecting and scattering and to provide the light guide and line illuminating device with less deviation in brightness performance.

Further, because the peak position of brightness in the sub-scanning direction can be adjusted by adjustment of the uneven surfaces, it is possible to improve the brightness of the manuscript surface directly above the photoelectric conversion element (sensor) even though the position of the photoelectric conversion element (sensor) differs for each type of image reading device. Since the distribution of brightness in the sub-scanning direction can be broadened by adjustment of the uneven surfaces, it is possible to secure stable uniformity of brightness even though there is deviation in attachment accuracy of each part consisting of the image reading device such as the line illuminating device and the photoelectric conversion element (sensor). Further, it is possible to lower the cost of the line illuminating device by eliminating the casing for covering the light guide.

What is claimed:

1. A light guide for transmitting, along a longitudinal direction, incident irradiation light from one end of the light guide, and for emitting this irradiation light from an emission plane, said light guide being provided at one end thereof with luminous means, characterized in that the light guide is provided with a light incident plane, an emission plane, and a reverse side spaced from the emission plane, said light guide having said light incident plane, said emission plane, and said reverse side being a unitary member, said reverse side having uneven surfaces for scattering the incident irradiation light so that a portion of the scattered light is emitted from the emission plane, wherein the uneven surfaces also comprise a plurality of ridgelines extending in a direction that is not perpendicular to the longitudinal direction, so that a portion of the light is reflected by the uneven surfaces toward the emission plane and emitted therefrom, and wherein the uneven surfaces are formed so that the uneven surfaces have a length that varies with distance from the end provided with the luminous means.

2. The light guide according to claim 1, wherein the uneven surfaces are integrally formed when the light guide is injection-molded.

3. The light guide of claim 1, wherein the light guide is housed in a casing in such a manner that the emission plane of the light guide is exposed.

4. The light guide of claim 1, wherein the light guide is incorporated in a device in such a condition that the entire surface of the light guide is exposed without being housed in a casing.

5. The light guide of claim 1, wherein the uneven surfaces do not abut the end provided with the luminous means.

* * * * *